June 17, 1947.  E. F. FLINT  2,422,348

MEDIAN VALUE DEVICE IN A SIGHTING INSTRUMENT

Filed Jan. 29, 1943  2 Sheets—Sheet 1

EDWARD F. FLINT
INVENTOR

BY

ATTORNEYS

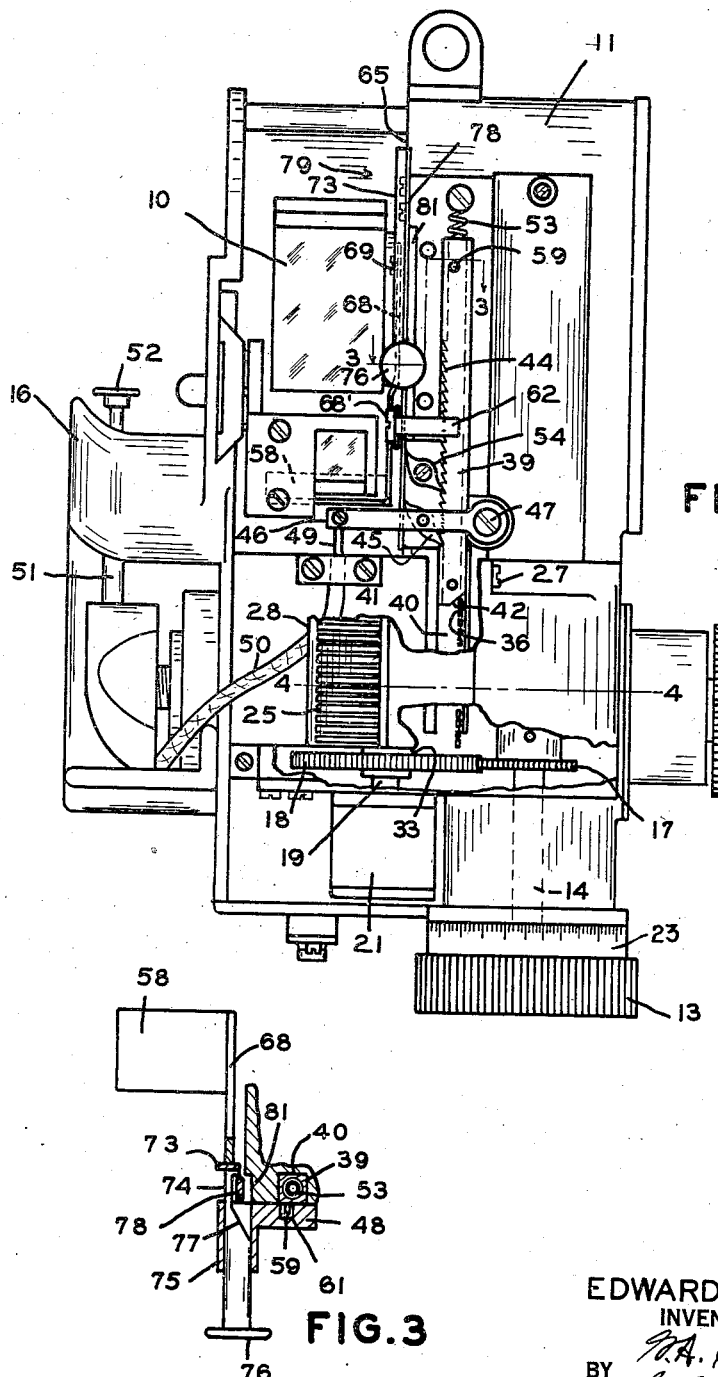

Patented June 17, 1947

2,422,348

UNITED STATES PATENT OFFICE 2,422,348

MEDIAN VALUE DEVICE IN A SIGHTING INSTRUMENT

Edward F. Flint, Rochester, N. Y., assignor to Bausch & Lomb Optical Company, Rochester, N. Y., a corporation of New York Application January 29, 1943, Serial No. 473,980

4 Claims. (Cl. 33—70)

This invention relates to calculating devices and more particularly to such a device for obtaining the median value of a group of quantitative measurements.

Frequently it becomes desirable to determine some single value which will be representative of the separate values of a group of quantitative measurements. Several methods are known for finding a value of this character.

One method frequently used is to divide the sum of the measurements by the number of measurements of the group to find the average. Although devices have been heretofore proposed for determining the average of a group of measurements or the like, they are not suitable in some applications as they are generally intricate and difficult to keep in proper adjustment, particularly where subject to hard usage.

Another method often used, the median method, is basically designed to ascertain such a representative value for a group composed of an odd number of measurements. The median of the group is obtained by checking off measurements thereof in an ascending or descending order of magnitude until the middle measurement is reached. For example, in a group of seven measurements, the median value will be the fourth largest measurement of the group.

The device of the present invention is particularly adapted for use with an octant or similar instrument for measuring the angular elevation of celestial bodies for calculations used in navigation, to determine the position of the observer relative to the earth's surface. Accurate navigation depends to a very large extent on the accuracy with which an observer can determine his position with relation to some celestial body and to increase the accuracy of the measurement of the angular elevation of the body, an observer will take a series of measurements and then through some suitable mechanism determine the average or median value of the series of measurements. Such instruments, especially where used with aircraft, are subject to hard usage and it has been found that many of the practical averaging devices cannot be efficiently used in connection with such instruments.

The device of the present invention is one by means of which the observer can determine the median value of a series of measurements taken by the octant and as the device is rugged, it can be used in connection with octants designed for use in aircraft navigation.

The device of the present invention comprises a number of movable indicating members of a number sufficient for each to represent a measurement in the group of measurements taken. The members are normally held in a null position but can be seriately released for movement so that they will be moved by actuation of the operating means of the octant and in a direction and at a magnitude dependent on the direction and magnitude of the movement of the operating means. Thus the relative displacement of the members indicates the relative magnitude of the measurements taken in the series. Each indicating member carries an index mark which will be visible to the observer and means are provided whereby the median of the relatively displaced index marks can be determined with means for translating the relative value of the index mark, representative, of the median of the measurements, into terms of quantity units.

As it is necessary for the observer to compute the average time of the day at which it is presumed the median of the series of measurements, was taken, no measurements should be made after the last indicating member has been released and moved by actuation of the operating member of the instrument. Otherwise, the time consumed in making the observations after the number of observations has been made for which the median device has been designed, will create an error in the computation of the time of the day of the median measurement. Heretofore the observer was forced to mentally record the observations as taken, or watch his instrument to insure that only the desired number of observations were made.

To overcome these difficulties, means are provided in the instrument of the present invention for indicating to an observer that he has taken the number of measurements for which his median device is designed. In the broader aspects of the invention, any signal could be used to indicate to the observer that he had taken the greatest number of measurements which could be recorded by the median device, such as means for occluding the optical path of the instrument. This means may comprise any means desired, but in the form of the invention now preferred, the occluding means comprises a shutter normally held out of the optical path of the instrument, but movable into the same by the means releasing the indicating members after the last of the indicating members has been released. Thus, an observer using the instrument of the present invention will be unable to take a greater number of measurements than the number for which the median device is designed.

To simplify the use of the invention, the shutter is automatically moved out of the optical path of the instrument by movement of the releasing member to its position in which the indicating members can be again locked against movement.

Other objects and advantages of the present invention will appear from the following description taken in connection with the accompanying drawings in which:

Fig. 2 is a front view of the octant embodying the present invention with a portion of the median device and adjacent parts of the casing of the octant broken away and cover plate 48 removed.

Fig. 3 is a section taken along line 3—3 of Fig. 2.

Figure 1:
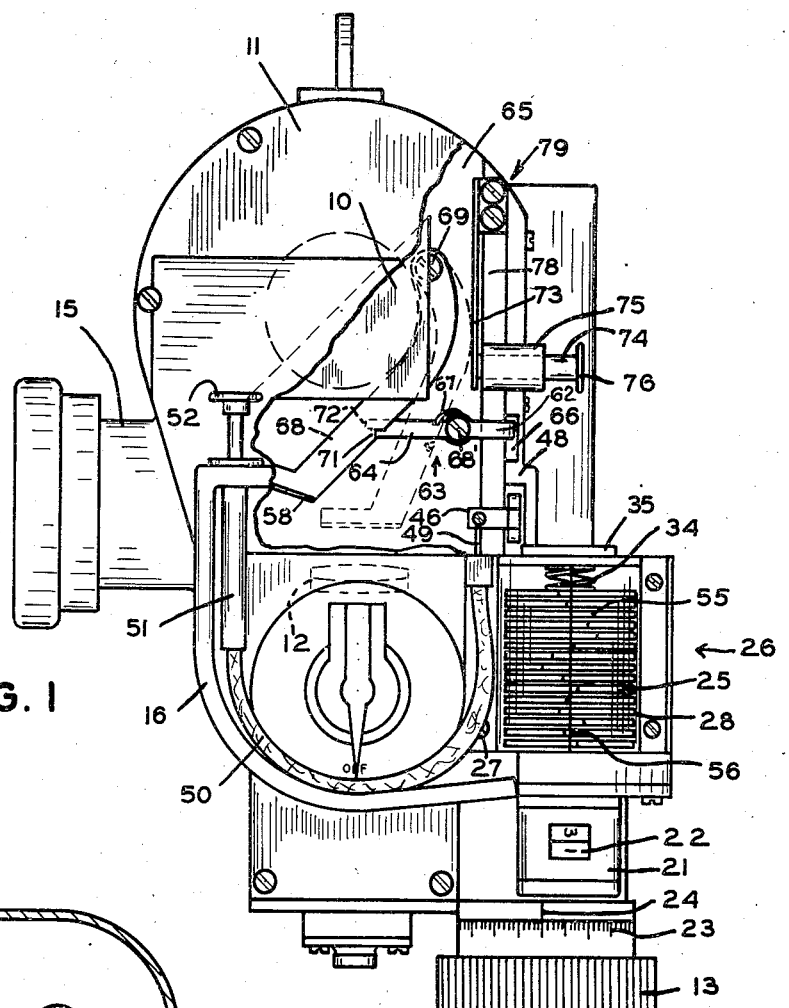
Fig. 1 is an elevational view of an octant embodying the invention with a portion of the casing of the octant broken away to more clearly illustrate the device of the present invention.

The device of the present invention, referring now to the drawing, has been illustrated in connection with an octant for measuring the angular elevation of a celestial body but it is to be understood that the device may be used in connection with other measuring instruments.

In the form of the invention illustrated, referring now to Fig. 1, the octant comprises an index reflector 10, pivotally mounted on the casing 11 and adapted to reflect light rays emanating from a celestial body to the optical system of the instrument which includes an objective 12 for forming an image of the celestial body. The position of the index reflector 10 may be adjusted by means of an operating knob 13 which through shaft 14 and a gear train, not disclosed, rotatably moves the index prism 10 in a recess formed in the front face of the instrument. The knob 13 is mounted on the underside of the instrument and in the use of the instrument is actuated by the left hand as the observer holds the ocular tube 15 to his eye by the handle 16 which he grasps with his right hand.

The shaft 14 carries a gear 17 which meshes with and drives a gear 18 carried by a shaft 19, driving a register 21 provided with a window 22 through which the indicating members of the register are visible. It is now preferred to have the register 22 calibrated to read in degrees the angular position of the observed celestial body above the horizon. A suitable scale 23 carried by the operating knob 12, indicates the minutes of the angular positions of celestial bodies above the horizon and as usual in scales of this type, an index or fiducial line 24 is formed on a stationary member adjacent to the scale 23.

It is now customary in the use of instruments such as here illustrated to take a series of measurements and then through arithmetical formula find the average of the measurements taken or by some suitable mechanism determine the average or median value of the series of measurements. This practice makes for a more accurate measurement and reduces to a minimum the effects of error.

In my application, Serial No. 412,275, filed September 25, 1941, I disclose and claim a device, for determining the median of a plurality of successive measurements of an instrument such as an octant, which forms a now preferred element of the combination of the present invention. The median device will not, therefore, be described in detail, for this device is fully described and claimed in my prior application above identified and only such details of the device will be recited here as are necessary to the understanding of the present invention.

In the preferred form of the device of the present invention, the median device is driven by the shaft 19 through the gear train 17 and 18, and the indicating members 25 of the median device are carried by the shaft 19. The indicating members, as well as the other mechanism of the median device, are mounted within a suitable housing 26, which is secured by screws or other fastening 27 to the housing 11. A semi-cylindrical window 28 of transparent material allows an observer to view the indicating members 25.

Figure 4:
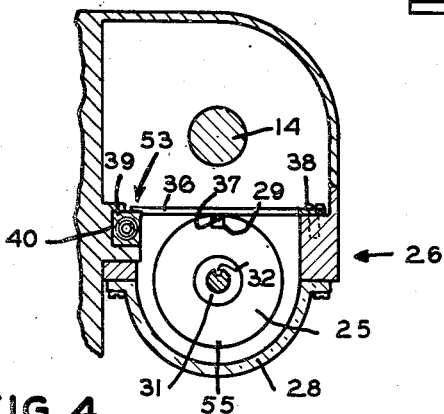
Fig. 4 is a section taken along line 4—4 of Fig. 2.

The indicating members 25 in the form of the invention illustrated comprises discs, each one of which, best shown in Fig. 4, is provided with a notch 29 in its peripheral surface. The number of discs 25 carried by the shaft 19 is limited only by the practical size of the median device and in keeping with the basis of median determination, I preferably employ an odd number of discs 25, fifteen of these indicating discs being illustrated in the drawing.

While the discs 25 are loosely placed upon the shaft 19, they are normally held thereon for rotation therewith by a plurality of friction washers 31 carried by the shaft 19 intermediate the indicating discs 25. Each washer is provided with a lug or projection 32 which cooperates with a longitudinal groove formed in the shaft 19 and keys the washer to the shaft. The hub 33 of the gear 19 serves as a washer at one end of the shaft and takes the thrust of the disc assembly created by a spring 34 carried by the shaft 19. The spring 34 seats on a cap 35 which journals the one end of the shaft 19 and acts against the uppermost washer 31 as viewed in Fig. 1. The friction between the discs 25 and the washers 31 should be such as to cause the discs to rotate with the washers as the shaft is rotated. It is to be noted, however, that the engagement between the shaft and each disc 25 is of such a nature that the shaft may be rotated relative to any disc which is held in a fixed position.

The discs are normally held against rotation with the shaft by a plurality of spring arms 36, each one of which carries a finger 37 which when received in the notch 29 of the disc holds the same against rotation with the shaft 19. The spring arms 36 are fixed to the casing at one end thereof by screws 38 while the upper ends thereof project into the path of movement of a slide 39 operating in a guide or channel 40 formed by ridges integral with the wall 41 of the casing 11, seen in elevation in Fig. 2 of the drawing. The slide 39 is formed at the one end thereof with a cam surface 42 which is adapted upon engagement with the spring arms 36 to cam the same to a position in which the fingers 37 thereof are moved out of engagement with the notches 29 of the discs 25.

In the use of the median device of the present invention, the indicating discs 25 are to be freed for rotation with the shaft 19 in a consecutive order, beginning with the uppermost disc 25 as viewed in Figs. 1 and 2, and working downwardly until all of the discs have been freed for rotation.

To move the slide 39 downwardly of the instrument and seriately release the discs, the one surface of the slide 39 is formed with a plurality of teeth 44 engaged by a spring pressed pawl 45 rotatably mounted on a lever 46 having one end pivotally mounted at 47 to the casing 11. The free end of the lever 46 projects through a slot formed in a plate 48 covering the slide 39 and has fixed thereto one end of a flexible cable 49 operating in a sheath 50 extending around the interior surface of the handle 16. A tube 51 extending downwardly from the top surface of the handle 16 houses a spring, not shown, for normally holding a small plunger 52 in an elevated position. The plunger is connected to the opposite end of the flexible cable 49 and it may be pressed against the action of the spring to move the cable 49 through the sheath 50 and rock the lever 46. Movement of the plunger is limited to that necessary to rock the lever 46 a distance sufficient to cause the pawl 45 to move upwardly, as viewed in Fig. 2, a distance equal to one tooth on the slide 39.

As a spring 53, having one end fixed to the casing 11 with the opposite end connected to the slide 39, tends to hold the latter in an elevated position, a second spring pressed pawl 54 is provided for holding the slide 39 against upward movement as the pawl 45 is moved out of holding engagement with one of the teeth 44 upon actuation of the lever 46. It will thus be seen that through the mechanism just described, the indicating discs 25 can be seriately released for movement with the shaft 19 by successive depressions of the plunger 52.

In the use of the device of the present invention, the observer after sighting the instrument on a celestial body, actuates the operating knob 13 until the image of the body formed by the optical system of the instrument is brought into coincidence with a datum plane such as the bubble of a liquid bubble level forming an artificial horizon, or the natural horizon, depending on the conditions under which the instrument is used. After coincidence has thus been made, he depresses the lever 52 to release the uppermost disc 25 for rotation with the shaft 19 which is driven through the first or gear train 17 and 18 from the shaft 14 carrying the operating knob 13. On the second manipulation of the operating knob 13 to again bring the image of the body into coincidence with the datum plane, the first released disc will move with the shaft 19 commensurate with the amount of movement of the operating knob 13 necessary to bring the observed body into coincidence with the artificial or natural horizon. As the first released disc will rotate with the shaft during the second observation, any point or reference on the first indicating disc will be displaced from its initial position by an amount proportional to the movement of the shaft 19 for the second observation. The second observation being completed and the second disc released, the operating knob 13 is again actuated and after coincidence has been obtained, the plunger 52 is again depressed to release a third disc for movement with the shaft 19, the lever 52 being depressed immediately following the making of each observation of the series to unlock or release the indicating member corresponding to that observation.

The indicating discs 25 in the form of the invention now preferred are used to indicate the relative magnitudes of the successive angular adjustments of the reflector 10 and to this end each disc carries an index mark 55. The mark may comprise any discernible indication desired, such as a small groove or notch carrying a filler of some material of a color which will contrast with the color of the disc. If desired, the filling material could be a luminous paint containing some radium so that the mark would be readily seen in the dark.

The marks are so formed on the discs 25 that they are in alignment when the discs are locked against movement and in the illustrated form of the device are disposed behind a fiducial line 56 formed on the transparent window 28 of the housing 26.

It will be seen now that upon release of the first disc 25, the index mark 55 thereof will be moved out of alignment with the remainder of the index marks by rotation of the shaft 19 through operation of the knob 13 in completing the second operation. When the second disc is released, the relative position between the index mark of the first disc and that of the second disc is maintained upon rotation of the shaft 19 since both the first and second discs will move or rotate together. In fact, as will later become apparent, any index mark which has been displaced from its initial alignment will throughout the remaining operation of the median device maintain its relative displacement with respect to the index mark on the next adjacent disc after this disc has been released for rotation with the shaft 19. Thus, the relative displacement between the first and second index marks will remain unchanged from that which existed between the marks after the second observation and while the second index mark was in its initial or aligned position. It hence follows that the separation of these two marks is a measure of the difference between the first and second observations and that the first index mark may be considered as representing the first observation and the second index mark the second observation.

As the first disc is not released until after the first observation has been made, there is no necessity for an observer to consult the register 22 and it is immaterial where the register and hence the reflector 10 is set prior to any series of observations.

After the last disc has been released for movement with the shaft 19, any movement of the same will displace all of the discs relative to their initial position of alignment by equal amounts so that their relative positions with respect to each other will remain unchanged. Thus the displacement between any two index marks whether they are adjacent or not, will be a measure of the difference in the value of the reading which the particular marks represent.

It will now be apparent that the ratio between the gears 17 and 18 is immaterial to the operation of the device. However, the maximum displacement of any index mark 55 when moved from its initial position will depend on this gear ratio. This ratio is preferably selected to accommodate the maximum displacement to be normally expected for any mark in order that each index mark may be observed through the window 28 after it has been displaced from its initial position.

The determination of the median value of the observations or measurements, the relative magnitudes of which are represented by the relative positions of the index marks 55, is made by merely ascertaining which mark is disposed in the middle of the series of marks. That is, which mark is positioned so that half of the remaining marks are disposed on one side of the same and the other half on the opposite side. In the device illustrated, fifteen discs have been shown and the medial mark representing the median value of the observations represented by the mark will be the eighth mark in either ascending or descending order. When the medial mark has been determined, the operating knob 13 is actuated until the medial mark is brought into coincidence with the fiducial line 56. As the register 22 is driven by the shaft 19, the register will also be operated by actuation of the knob 13 and the latter will indicate directly the value of the median of the observations in degrees.

It is possible for unequal numbers of index marks to be located on opposite sides of the fiducial line if several of the index marks are in alignment after completion of a group of measurements. In this instance, the same procedure is followed by counting from one extreme to the eighth index mark. The fact that several marks may be aligned is immaterial and they are counted as separate marks. Should one or more index marks be in alignment with the eighth or medial mark, they are also set on the fiducial line in evaluating the median.

Although actuation of the operating knob 13 after the fifteenth disc has been released will not affect the relative position of the discs and consequently the accuracy of the median value when determined yet as an average time of the day must be determined for the median of the fifteen readings, the time of the first and fifteenth reading must be computed. Thus, if eighteen observations were inadvertently made, the average time would not be the average for the series of fifteen observations because the time is determined by observing a watch prior to the first and subsequent to the last observation.

Heretofore an observer was forced to either mentally note the number of each observation as it was completed or after he had completed what he estimated to be the last observation inspect the median device to ascertain if he had actually taken the number of observations for which the device was designed. In either case, some time was lost in completing the desired number of observations and if a greater number of observations were taken, the error just discussed was created.

To prevent the possibility of this error, means are provided in the present invention for indicating to the observer when the last disc has been released and the final observation completed. In the broader aspects of the present invention, this means may comprise any signal means for advising the observer that the final observation has been made. In the preferred form of the device, however, this means comprises a shutter 58 automatically moved into the optical path of the instrument for occluding the same at the completion of the series of observations.

The shutter 58 is preferably actuated by movement of the slide 39 and to this end the latter carries a pin 59 operating in a slot 61 formed in the inner side of the cover plate 48 and adapted to engage the shorter arm 62 of an L-shaped lever 63, the longer arm 64 of which is pivotally mounted on the wall 65 of the recess formed in a front face of the instrument. The arm 62 projects through a recess 66 formed in the cover plate 48 and into the path of the pin 59 to be engaged thereby as the slide 39 is moved to release the last disc 25. The pin 59 as it is moved into engagement with the leg 62 rocks the lever 63 clockwise as seen in Fig. 1 against the action of a spring 67 carried by the pivot pin 68' on which the lever 63 is mounted. This movement of the lever causes the free end of the longer arm to be moved out of engagement with a detent on an arm 68 as described below. This arm 68 is pivotally mounted at one end thereof on a pin 69 carried by the wall 65 and a spring, not shown, normally urges the same in a counterclockwise direction. The shutter 58 is carried at the free end of the arm 68 and is moved into a position, above the lens 12, in which it occludes the optical path of the instrument when the arm 68 is urged by the spring from its position as shown in full lines to that shown in broken lines in Fig. 1.

To prevent the arm 64 of the lever 63 from inadvertently releasing the arm 68, the latter is provided with a detent 71 formed preferably by partially cutting an edge portion of the same and then bending over the partially cut section. The detent thus formed engages a seat 72 formed on the arm 64 of lever 63 by blanking out a portion at the free end thereof.

It will be seen, referring particularly to Fig. 1, that as the pin 59 engages and urges the arm 62 of the lever downwardly, the free end of the arm 64 will move upwardly and swing the arm 68 in the same direction until the detent 71 is displaced relative to the seat 72 to a distance sufficient to permit the arm 68 to swing the shutter 58 downwardly as viewed in Fig. 1 to overlie the objective 12 and occlude the light path to the eyepiece of the instrument.

A leaf spring 73 fixed at one end to the casing of the instrument limits the swinging movement of the arm 68 and to some extent cushions the shock of the stop. This spring is engaged adjacent the free end thereof by a plunger 74 slidably mounted in a boss 75 carried by the cover plate 48. The plunger is normally held by some suitable resilient means such as a spring, not shown, in the position illustrated in Fig. 1, but is movable against the action of the spring to urge the leaf spring 73 and the arm 68 to the left as viewed in Fig. 1. Thus the plunger 74 is used to return the arm 68 to its position wherein it is engaged and held against movement by the arm 64 of the lever 63. It will be obvious now that by merely pushing the knob 76 of the plunger, the arm 68 can be returned to its engaged position.

To simplify the operation of the device of the present invention, the plunger 74 is also used to reset the median device. The plunger 74, as best illustrated in Fig. 3, is cut away to form a cam surface 77 movable into engagement with a leaf spring 78 fixed at 79 to the casing and extending downwardly thereof and engaged by the pawls 45 and 54. The cam 77 upon movement of the plunger 74 cams leaf spring 78 to the right as viewed in Fig. 3. The casing is cut away at 81 to permit the spring 78 to be forced over a distance sufficient to move the pawls out of engagement with the teeth 44 of the slide 39 whereupon the spring 53 moves the slide 39 back to its original position. This movement of the slide 39 to its original position permits the spring arms 36 to return to their normal position or at least to a position in which the fingers 37 thereof engage the peripheral surfaces of the discs 25. With the spring arms 36. In this position, rotation of the shaft 19 through actuation of the operating knob 13 will rotate the discs until the notches 29 formed therein are brought opposite the fingers 37, which will then snap into place to hold the indicating discs against rotation with the shaft 19.

The instrument is now reset and a second series of observations can be made at any time desired, the median device being again operated as heretofore explained.

It will be obvious that measurements or observations of a number less than the capacity of the median device can be worked by the mechanism I have shown. For example, if the device is operated only nine times, only nine indicating members will be freed for movement, but the median of the nine values may be located or determined in the manner already described. The fact that six of the indicating members or discs are not released will not interfere with the operation of the mechanism to find the median of the nine values which have been recorded.

It should also be noted that my invention is not necessarily limited to evaluating an odd number of measurements. Where there is a group composed of an even number of observations greater than two, there will be two middle values represented by the position of the two middle index marks. The median for such a group is readily determined by rotating the shaft 19 to cause the middle index marks to be located at equal distances from but on opposite sides of the fiducial line.

From the foregoing, it will be apparent that I have provided a median device of simple design and operation which is adaptable for use in many fields of use. Besides adaptation to the navigation instrument disclosed, it can be used in any optical measuring instrument and while the present preferred embodiments of the invention have been illustrated and described herein, it is to be understood that the invention is not limited thereby but is susceptible of changes in form and detail within the scope of the appended claims.

I claim:

1. In a device for determining the median of a plurality of measurements of an optical instrument, a housing; a shaft mounted on the housing for rotation in accordance with each measurement; a plurality of indicating members mounted upon said shaft and frictionally engaged thereto for rotation therewith; an index mark on each indicating member; locking means mounted in said housing and normally engaging said indicating members for locking the same against rotation with said shaft; cam means movable to disengage said locking means to successively free one indicating member at a time for rotation with said shaft whereby the relative displacement of the index marks of the seriately released indicating members indicates the relative magnitudes of the completed measurements; means for occluding the optical path of said instrument; resilient means for urging said occluding means into the optical path; means for holding said occluding means out of the optical path of said instrument; means for releasing said occluding means from said holding means, said means being made operative by movement of said cam means in releasing the means locking the last indicating member against rotation; register means made operative by rotation of said shaft for translating the position of the index mark representative of the median of said measurements into units of the measured quantity; and means including an actuator for returning said cam means to a retracted position whereby said locking means can engage said indicating members, operation of said actuator moving said occluding means to a position wherein said holding means is operative to hold said occluding means out of the optical path of said instrument.

2. In a device for determining the median of a series of measurements of an instrument having operating means successively moved for making said measurements, a plurality of movable indicating members of a number equal to the number of measurements of the series; means for locking said indicating members against movement in a null position; means movable from an initial position for seriately releasing said indicating members as each measurement of the series is made; means operatively connecting said operating means and said members whereby the indicating members as released are moved independently in accordance with the movement of successive actuations of the operating means; normally inactive signal means; means actuated by movement of said releasing means to release the last of the indicating members for rendering said signal means operative whereby the user is apprised that measurements equal to the number of indicating members have been completed; means for determining the median value of the group of measurements indicated by the relative positions of said members; and other means for returning said releasing means to the said initial position whereby said indicating members can be relocked in said null position, said other means including means for rendering said signal means again inactive.

3. In an angle measuring instrument having means for establishing an angularly movable line of sight with operating means for moving the line of sight, a plurality of indicating members; means for locking each indicating member against movement; cam means movable from an inactive position for seriately disengaging said locking means; means for moving the indicating members as disengaged in accordance with the movement of the operating means; means for holding successively moved indicating members against relative displacement upon subsequent movement of said operating means whereby the relative displacements of the indicating members indicate the relative magnitudes of successive measurements; a shutter; means for moving said shutter into a position in which said line of sight is occluded; means for holding said shutter out of the line of sight; means for releasing said shutter from said holding means upon movement of said cam means to release the last of said indicating members whereby the shutter is moved into said line of sight to occlude the same and apprise the user that a number of measurements has been completed equal to the number of indicating members; means for determining the median value of measurements indicated by the relative positions of the indicating members; other means for returning said cam means to a position wherein all of said locking means are released for engagement with said indicating members; and a common actuator for rendering said other means operative and for moving said shutter to a position wherein it does not occlude said line of sight.

4. In an observation instrument the combination of a casing, movable operating means on the casing for making observation measurements, means for indicating the median value of a series of a predetermined number of measurements, said last-named means comprising a plurality of movable indicating members of a number equal to the predetermined number of measurements, means for moving each of said members independently by and in accordance with the movement of said operating means when making each measurement, locking means normally locking each indicating member in a null position, releasing means for seriately unlocking each indicating member for movement in accordance with the movement of the operating means for making each measurement, and signal means actuated by the releasing means upon the unlocking of the last indicating member of the series to indicate that the series is completed.

EDWARD F. FLINT.

REFERENCES CITED

The following references are of record in the file of this patent:

UNITED STATES PATENTS

| Number | Name | Date |
|---|---|---|
| 2,252,341 | Everitt | Aug. 12, 1941 |